Feb. 26, 1957 J. B. LANG 2,782,973
AUTOMOBILE TOP CARRIER FOR SKIS
Filed May 25, 1954 2 Sheets-Sheet 1
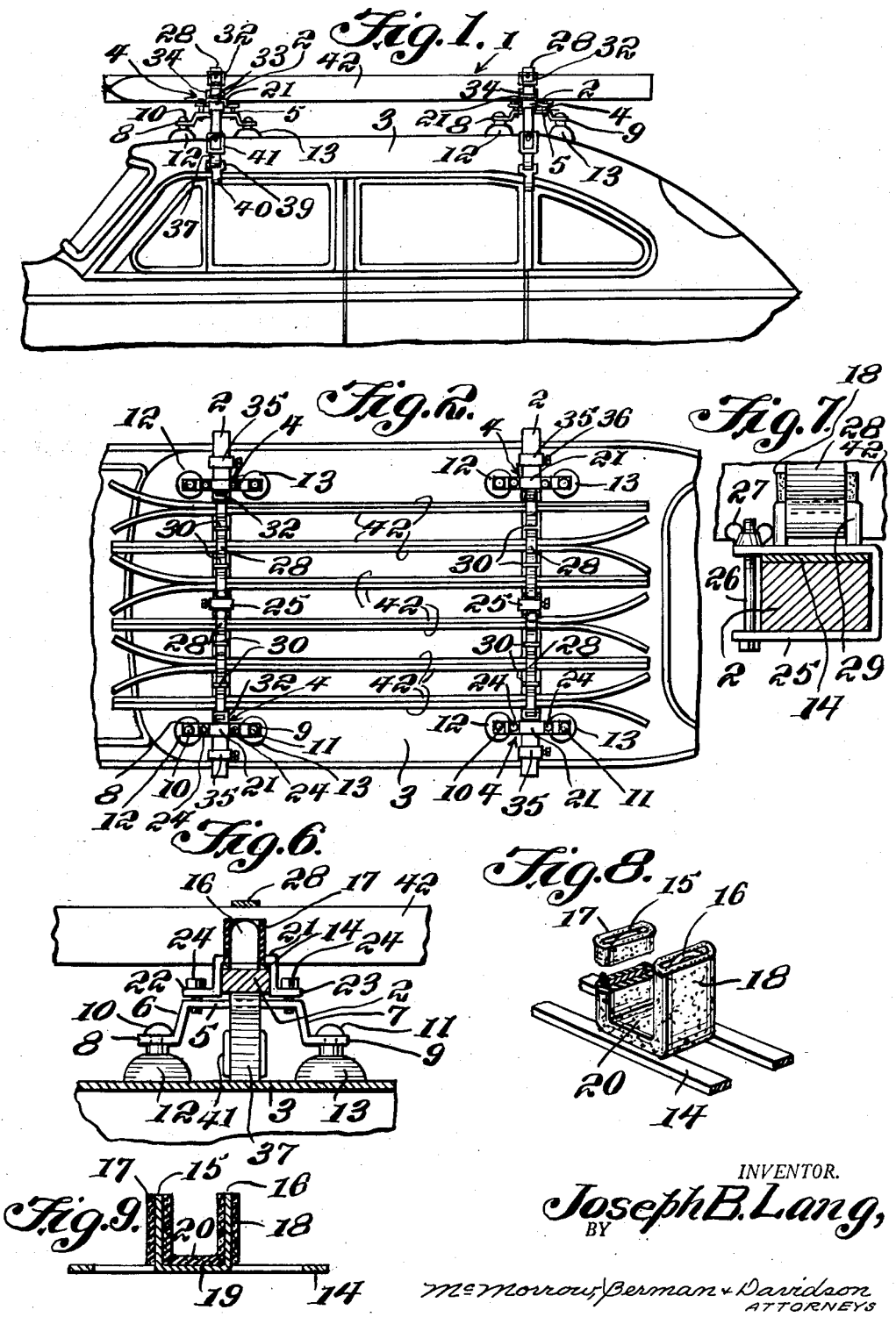
INVENTOR.
Joseph B. Lang,
BY
McMorrow, Berman & Davidson
ATTORNEYS Feb. 26, 1957  J. B. LANG  2,782,973
AUTOMOBILE TOP CARRIER FOR SKIS
Filed May 25, 1954  2 Sheets-Sheet 2
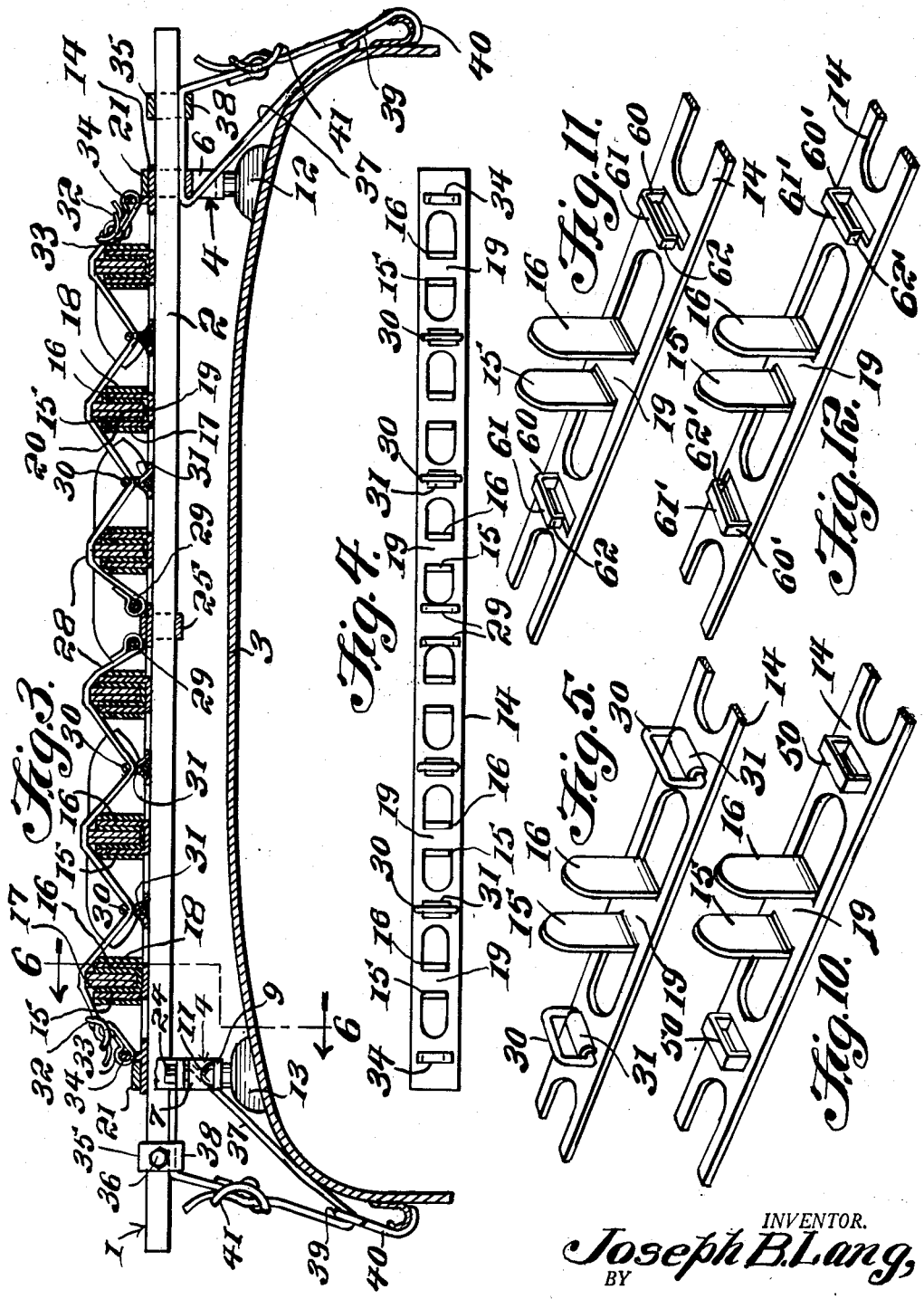
INVENTOR.
Joseph B. Lang,
BY
McMorrow, Berman & Davidson
ATTORNEYS

United States Patent Office 2,782,973
Patented Feb. 26, 1957

2,782,973
AUTOMOBILE TOP CARRIER FOR SKIS
Joseph B. Lang, East Grand Forks, Minn.
Application May 25, 1954, Serial No. 432,262
8 Claims. (Cl. 224—42.1)

This invention pertains to an improved automobile top carrier for skis.

It has long been a problem to provide satisfactory means for transporting unwieldy articles of considerable length on automotive vehicles, such as skis.

Accordingly, one of the primary objects of this invention is to provide a more practical and efficient ski carrier for mounting on the roof of an automotive vehicle, which can be removed without marring the top of the vehicle.

Another object of the invention is to provide a ski carrier which can accommodate a plurality of pairs of skis and which may be attached and detached from an automobile roof with facility.

A further object of this invention is to provide a carrier of the type described which is inexpensive to manufacture, non-complex in construction and assembly, and durable in use.

Other and further objects and advantages of the present invention will become more apparent from a consideration of the following specification when read in the light of the annexed drawing, in which:

Figure 1 is a side elevation of a ski carrier constructed in accordance with the teachings of this invention, and shown as attached to the top or roof of an automobile;

Figure 2 is a top plan view of the ski rack shown in Figure 1;

Figure 3 is an enlarged transverse cross-sectional view of the rack shown in Figures 1 and 2;

Figure 4 is a top plan view of one of the racks of the ski carrier, per se;

Figure 5 is an enlarged fragmentary perspective view of the rack shown in Figure 4;

Figure 6 is a cross-sectional view taken on the vertical plane of line 6—6 of Figure 3, looking in the direction of the arrows;

Figure 7 is a fragmentary side elevation of the clamping means;

Figure 8 is an exploded perspective view of one of the ski rack brackets;

Figure 9 is a medial cross-sectional view of the bracket shown in Figure 8; and

Figures 10, 11 and 12 all illustrate modified racks of this invention.

Referring now more specifically to the drawings, the illustrated ski carrier 1 comprises a pair of spaced parallel, flat, elongated, substantially rectangular racks which are mounted transversely of an automobile top or roof 3 at their respective opposite ends on inverted, substantially U-shaped brackets 4. Each bracket 4 comprises a substantially horizontal bight portion 5 (see Figure 6) having downwardly diverging arms 6, 7 which terminate in outwardly turned horizontal flanges 8, 9. The latter are secured by bolts or screws 10, 11 to conventional suction cups 12, 13 which are attached to the roof 3 in the conventional manner.

Each of the racks comprises an elongated strip 14 of sheet metal or other rigid material (see Figures 3, 4 and 5) provided with a plurality of pairs of struck up portions forming a pair of vertical arms 15, 16 to hold a pair of skis on the strip 14 therebetween. As shown in the drawings, the pairs of arms 15, 16 are spaced longitudinally of the strip 14 and extend transversely thereof. The arms 15, 16 are completely encased in sponge rubber or other suitable material at 17, 18, and the portion 19 of the strip 14 between the arms has its upper face also lined at 20 with sponge rubber or other suitable material.

The elongated strips 14 are superposed longitudinally on bars 2 and inverted U-shaped clamps 21 having depending flanges 22, 23 at opposite ends thereof are placed over the strips 14 and the bars 2 and clamped by stud bolts to the bight portions 5 of the brackets 4.

Intermediate the ends of the racks the strips 14 and the bars 2 are clamped (see Figure 7) together by a C-clamp 25 tightened by a bolt 26 and wing nut 27.

Straps 28 formed of leather or other suitable material have inner ends looped through slots formed in lugs 29 on opposite sides of the C-clamps and extend longitudinally of the racks in opposite directions toward the outer ends thereof. As shown in Figure 3, the straps 29 are threaded through loops 30 pivotally connected to raised hollow bosses on the strips 14 between adjacent pairs of arms 15, 16 and are connected at their outer ends to buckles 32 on the free ends of buckle straps 33 having their other ends engaged through loops 34 struck out from the strip 14 immediately adjacent the clamps 21.

The bars 2 have end portions which extend beyond the ends of the strips 14.

A substantially rectangular clamping collar 35 having a set screw 36 is slidably mounted on each end of the cross bars 2. A strap 37 at each end of the bars 2 is threaded between the undersides thereof and the lower sides 38 of the collars 35 and passes between the undersides of the bars 2 and the bight portions of the brackets 4, thence downwardly and through loops 39 mounted on one end of hooks 40 having the other ends thereof secured under the rain drains of the car roof 3, and extend upwardly to buckles 41 connected to the other end of the straps 37.

With both of the racks strapped on the car roof, with the pairs of arms 15, 16 of one aligned with those of the other rack, a pair of skis are disposed longitudinally of the car roof within each pair of arms as shown in Figure 2, and the straps 28 are then tightened thereover (see Figure 3) and secured by the buckles 32.

In the form of the invention shown in Figure 10 the pivoted loops 30 are replaced by U-shaped loops 50 which are struck out of the strips 14 and are closed.

The form of the invention shown in Figure 11 has loops 60 similar to the loops 50 except that one end of the loops 60 are spaced from the strips 14, as indicated at 62, thereby providing openings through which the strap 28 may be laterally inserted. In this case the openings all face the same side of the strip 14.

In the form of the invention illustrated in Figure 12, the loops 60′ are similar to the loops 60 except that the open ends of alternate ones of the loops face opposite sides of the strip 14.

Having described and illustrated a plurality of embodiments of the instant invention, it will be understood that the same are offered by way of example, and that the invention is to be limited only by the scope of the following claims.

What is claimed is:

1. An automobile top carrier comprising a pair of spaced racks to extend across the top, each of said racks comprising a bar to extend from side to side of the top and having ends, a strip overlying and extending along the bar, said strip having ends terminating in spaced relation to the ends of the bar, top engaging mounting brackets beneath the bar at the ends of the strip, said brackets having horizontal bight portions upon which said bars rest, inverted U-shaped clamps having bight portions overlying the ends of the strips and legs depending at opposite sides of the strip and of the bar, means securing said legs to the bight portions of the brackets, spaced pairs of spaced vertical arms rising from said strip between its ends.

2. An automobile top carrier comprising a pair of spaced racks to extend across the top, each of said racks comprising a bar to extend from side to side of the top and having ends, a strip overlying and extending along the bar, said strip having ends terminating in spaced relation to the ends of the bar, top engaging mounting brackets beneath the bar at the ends of the strip, said brackets having horizontal bight portions upon which said bars rest, inverted U-shaped clamps having bight portions overlying the ends of the strips and legs depending at opposite sides of the strip and of the bar, means securing said legs to the bight portions of the brackets, spaced pairs of spaced vertical arms rising from said strip between its ends, spaced pairs of upstanding arms on said strip between its ends, strap loops on the strip between adjacent pairs of arms, other loops on said clamps, and retaining straps having opposite ends secured to said other loops and overlying the pairs of arms and engaged through the strap loops.

3. An automobile top carrier comprising a pair of spaced racks to extend across the top, each of said racks comprising a bar to extend from side to side of the top and having ends, a strip overlying and extending along the bar, said strip having ends terminating in spaced relation to the ends of the bar, top engaging mounting brackets beneath the bar at the ends of the strip, said brackets having horizontal bight portions upon which said bars rest, inverted U-shaped clamps having bight portions overlying the ends of the strips and legs depending at opposite sides of the strip and of the bar, means securing said legs to the bight portions of the brackets, spaced pairs of spaced vertical arms rising from said strip between its ends, collars on the ends of the bar outwardly of the clamps, said collars having under portions spaced beneath the bars, rack securing means comprising hooks for engaging portions of the automobile top and securing straps connected to said hooks and passing between said under portions of the collars and the bars and between the bars and the bight portions of the brackets.

4. An automobile top carrier according to claim 2 wherein said upstanding arms are struck up from the strips.

5. An automobile top carrier according to claim 2 wherein said upstanding arms are struck up from the strips and said strap loops are pivoted to the strips.

6. An automobile top carrier according to claim 2 wherein said upstanding arms are struck up from the strips and said loops are fixed and struck out of the strips.

7. An automobile top carrier according to claim 2 wherein said upstanding arms are struck up from the strips and said loops are fixed and have open ends facing one side of the strips.

8. An automobile top carrier according to claim 2 wherein said upstanding arms are struck up from the strips and said loops are fixed and have open ends, the open ends of alternate ones of the loops facing opposite sides of the strips.

References Cited in the file of this patent

UNITED STATES PATENTS

| | | |
|---|---|---|
| 2,409,946 | MacLeod | Oct. 22, 1946 |
| 2,434,826 | Wubben | Jan. 20, 1948 |
| 2,554,650 | Waite | May 29, 1951 |

FOREIGN PATENTS

| | | |
|---|---|---|
| 61,913 | Norway | Jan. 15, 1940 |